United States Patent
Shaikli

(10) Patent No.: US 7,668,187 B2
(45) Date of Patent: *Feb. 23, 2010

(54) METHOD FOR REORDERING SEQUENCED PACKETS

(75) Inventor: Nadim Shaikli, San Diego, CA (US)

(73) Assignee: Topside Research, LLC, Williamsburg, VA (US)

( * ) Notice: Subject to any disclaimer, the term of this patent is extended or adjusted under 35 U.S.C. 154(b) by 415 days.

This patent is subject to a terminal disclaimer.

(21) Appl. No.: 11/610,447

(22) Filed: Dec. 13, 2006

(65) Prior Publication Data

US 2007/0081539 A1    Apr. 12, 2007

Related U.S. Application Data

(63) Continuation of application No. 10/151,582, filed on May 16, 2002, now abandoned.

(51) Int. Cl.
  *H04L 12/56* (2006.01)
(52) U.S. Cl. .................. 370/412; 370/428; 370/517
(58) Field of Classification Search .......... 370/395.4, 370/392, 395.72, 388, 360, 389, 412, 253, 370/408, 394, 429, 396, 517; 710/307, 65, 710/305, 1, 22, 6, 52, 30, 57; 711/153, 119, 711/148, 108; 709/223
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu | |
| 4,740,954 A | 4/1988 | Cotton | |
| 4,754,451 A | 6/1988 | Eng et al. | |
| 5,022,025 A | 6/1991 | Urushidani et al. | |
| 5,127,000 A * | 6/1992 | Henrion | 370/394 |
| 5,412,646 A * | 5/1995 | Cyr et al. | 370/411 |
| 5,550,823 A | 8/1996 | Irie | |
| 5,555,543 A | 9/1996 | Grohoski | |
| 5,606,370 A | 2/1997 | Moon | |

(Continued)

OTHER PUBLICATIONS

Distributed deadlock detection and resolution based on hardware clocks; Mayo, J.; Kearns, P.; Distributed Computing Systems, 1999. Proceedings. 19th IEEE International Conference on May 31-Jun. 4, 1999 pp. 208-215.*

Predictable timestamp under synchronized clocks in a network; Geng-Sheng Kuo; Jing-Pei Lin; Information Theory, 1994. Proceedings., 1994 IEEE International Symposium on Jun. 27-Jul. 1, 1994 p. 68.*

(Continued)

*Primary Examiner*—Salman Ahmed
(74) *Attorney, Agent, or Firm*—SoCal IP Law Group LLP; Steven C. Sereboff; John E. Gunther

(57) ABSTRACT

There are disclosed a method and apparatus for reordering sequenced data packets. An expiration time is calculated for each received data packet. The expiration time and a packet sequence number are stored in a table. The table is read to determine the next data packet to be transmitted in sequence number order. The next data packet is output if available. If the next data packet is not available, a true expiration time is determined for the unavailable next data packet. If the unavailable next data packet fails to arrive before a current time is greater than the expiration time of the unavailable data packet, the unavailable next data packet is considered lost.

18 Claims, 6 Drawing Sheets

U.S. PATENT DOCUMENTS

| | | | |
|---|---|---|---|
| 5,845,145 A | | 12/1998 | James |
| 5,859,835 A * | | 1/1999 | Varma et al. ............... 370/229 |
| 5,860,085 A | | 1/1999 | Stormon |
| 5,898,689 A | | 4/1999 | Kumar |
| 5,905,911 A | | 5/1999 | Shimizu |
| 5,909,440 A | | 6/1999 | Ferguson |
| 5,923,893 A | | 7/1999 | Moyer |
| 5,982,749 A | | 11/1999 | Daniel |
| 6,026,092 A | | 2/2000 | Abu-Amara |
| 6,067,408 A | | 5/2000 | Runaldue |
| 6,088,721 A * | | 7/2000 | Lin et al. .................... 709/214 |
| 6,138,185 A | | 10/2000 | Nelson |
| 6,172,927 B1 | | 1/2001 | Taylor |
| 6,192,465 B1 | | 2/2001 | Roberts |
| 6,389,489 B1 | | 5/2002 | Stone |
| 6,442,674 B1 | | 8/2002 | Lee |
| 6,460,120 B1 | | 10/2002 | Bass et al. |
| 6,493,347 B2 | | 12/2002 | Sindhu |
| 6,570,876 B1 | | 5/2003 | Aimoto |
| 6,574,194 B1 | | 6/2003 | Sun |
| 6,629,147 B1 | | 9/2003 | Grow |
| 6,687,768 B2 | | 2/2004 | Horikomi |
| 6,754,741 B2 | | 6/2004 | Alexander |
| 6,781,992 B1 | | 8/2004 | Rana et al. |
| 6,795,870 B1 | | 9/2004 | Bass |
| 6,842,443 B2 | | 1/2005 | Allen, Jr. et al. |
| 6,907,041 B1 * | | 6/2005 | Turner et al. ............... 370/412 |
| 6,934,760 B1 | | 8/2005 | Westbrook et al. |
| 6,967,951 B2 * | | 11/2005 | Alfano ....................... 370/394 |
| 6,977,941 B2 | | 12/2005 | Takahashi |
| 6,987,760 B2 | | 1/2006 | Calvignac et al. |
| 6,996,624 B1 * | | 2/2006 | LeCroy et al. ............... 709/231 |
| 7,035,214 B1 * | | 4/2006 | Seddigh et al. ............. 370/231 |
| 7,271,765 B2 * | | 9/2007 | Stilp et al. .................. 342/457 |
| 7,349,393 B2 | | 3/2008 | Pierson |
| 7,363,572 B2 * | | 4/2008 | Sidenblad et al. ........... 714/758 |
| 7,403,525 B2 | | 7/2008 | Sano et al. |
| 7,471,870 B2 * | 12/2008 | Bradstreet et al. ............. 386/46 |
| 7,472,304 B2 * | 12/2008 | Malekkhosravi et al. ..... 713/401 |
| 7,480,308 B1 | 1/2009 | Cohen et al. |
| 7,529,245 B1 | 5/2009 | Muller et al. |
| 7,535,913 B2 * | 5/2009 | Minami et al. ............... 370/401 |
| 7,577,145 B2 * | 8/2009 | Maruyama et al. .......... 370/392 |
| 2001/0037435 A1 | 11/2001 | Van Doren |
| 2002/0165947 A1 | 11/2002 | Ackerman |
| 2003/0035427 A1 | 2/2003 | Alasti et al. |
| 2009/0046593 A1 * | 2/2009 | Ptasinski et al. ............. 370/252 |

OTHER PUBLICATIONS

Dynamic priority protocols for packet voice; TM Chen, J Walrand, DG Messerschmitt—IEEE journal on selected areas in communications, 1989.*

PetaSwitch Solutions, Inc., The Pisces Chipset, Product Brief, 2001, http://www.peta-switch.com/products/product_brief.htm.

PetaSwitch Solutions, Inc., PetaSwitch Solutions Announces Raising $4 Million in First Round Financing, Press Release, 2001, http://peta-switch.com/newsroom/press_releases.htm.

PetaSwitch Solutions, Inc., Company Overview, 2001, http://peta-switch.com/markets/overview.htm.

Gupta, Scheduling in Input Queued Switches: A Survey, Jun. 1996, Department of Computer Science, Stanford University, California.

Schoenen, et al., Distributed Cell Scheduling Algorithms for Virtual-Output-Queued Switches, Dec. 1999, pp. 1211-1215, vol. 1, GLOBECOM, IEEE Global Telecommunications Conference.

Fahmy, A Survey of ATM Switching Techniques, Aug. 14, 2001, Department of Computer and Information Science, The Ohio State University.

Stiliadis, et al., Rate-Proportional Servers: A Design Methodology for Fair Queueing Algorithms, Dec. 1995, Computer Engineering & Information Sciences, University of California. Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

* cited by examiner

METHOD FOR REORDERING SEQUENCED PACKETS

RELATED APPLICATION INFORMATION

This patent is a continuation of U.S. application Ser. No. 10/151,582, filed May 16, 2002, entitled "SYSTEM FOR REORDERING SEQUENCED BASED PACKETS IN A SWITCHING NETWORK", now abandoned.

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates generally to the operation of switching networks, and more particularly, to a system for reordering sequence based packets in a switching network.

2. Description of the Related Art

Communications networks are now required to handle data at very high data rates. For example, a data rate of 10 gigabits per second (Gbps) is common. When it is required to process data at these speeds, multiple high-speed parallel connections may be used to increase the effective bandwidth. However, this may result in one or more transmission problems, since the data streams must be divided to be distributed over the multiple parallel connections, and then at some point after parallel transmission, recombined to form the original streams.

FIG. 1 shows a block diagram 100 of a typical network structure for transmitting data frames (or data packets) from source processors 102 to a destination processor 104 via multiple communication fabrics 106. The data streams include packets or frames that may comprise a fixed amount of data. For example, stream A may include frames A0, A1, and A2 that are received by the source processor A and transmitted to each of the fabrics as shown. The stream B may include frames B0, B1 and B2 that are transmitted to the fabrics by source processor B as shown, and the stream C may include frames C0, C1 and C2 that are transmitted to the fabrics by source processor C as shown.

Once the frames are received by the fabrics, they are transmitted to the destination processor 104 as shown. The destination processor receives the frames and combines them in the order they arrive to form output stream D for transmission to another destination. In some systems, the destination processor breaks up stream D into multiple streams and transmits the multiple streams to another destination via multiple communication fabrics.

A significant problem that exists with current transmission systems, such as the system shown in FIG. 1, is that the frames may end up in the wrong order when stream D is formed and transmitted from the destination processor D. For example, if frames are originally transmitted via multiple transmission paths, they might arrive at the destination in an order that is different from how they were transmitted. For example, the frames may be output in stream D in the order shown at 108. In this case, frame B2 is output before frame B1, and frame C2 is output before frame C1. Thus, the frames for source processors B and C are transmitted out of order. In such a case, it may be necessary to discard out of order frames of data and request a new transmission of those frames. As a result, additional overhead will be used and a corresponding loss of transmission bandwidth will be realized.

Another problem that may occur in current transmission systems involves frames that may be lost in transmission, so that they never arrive at the destination processor. In this situation, it becomes difficult to determine when a frame is lost or merely delayed in transmission. Furthermore, if a frame is lost, the transmission of the received frames may be excessively delayed or blocked because of delays associated with the lost frame. Thus, the received frames pay a penalty for the lost or delayed frames in that the transmission of the received frames may be delayed or blocked completely.

Therefore, it would be desirable to have a system to reorder frames of data in a transmission system so that the frames are output in the correct order, thereby improving transmission efficiency. The system should also provide a way to process lost or delayed frames so that the transmission of received frames at a destination processor is not excessively delayed or blocked.

SUMMARY OF THE INVENTION

The present invention includes a system for reordering sequenced based packets in a switching network. For example, in one embodiment of the invention, a reordering system is provided that receives packets from multiple sources and reorders the received packets based on a unique sequence number and arrival time associated with each packet. In another embodiment of the invention, the packets are further provided with a priority, and the priority is used to determine the order that the packets are output.

In one embodiment included in the present invention, a system is provided for reordering data packets at a destination processor in a packet switching network, wherein a plurality of source processors transmit the data packets to the destination processor via one or more communication fabrics, and wherein a sequence identifier is associated with each data packet. The system comprises time stamp logic that operates to associate a receive time indicator with each received data packet. The system also comprises Enqueue logic that operates to compute an expiration time for each received packet based on the receive time indicator, and to store the expiration time into a table based on the sequence identifiers associated with the received packets. The system also comprises Dequeue logic that operates to read the table to determine the received data packets to output in an output stream, so that the received data packets are output in a selected order, wherein the Dequeue logic also operates to determine a true expiration time for one or more unreceived data packets, and wherein if the true expiration time for a selected unreceived data packet is reached, the Dequeue logic operates to omit the selected unreceived data packet from the output stream.

In another embodiment included in the present invention, a method is provided for reordering data packets at a destination processor in a packet switching network, wherein a plurality of source processors transmit the data packets to the destination processor via one or more communication fabrics, and wherein a sequence identifier is associated with each data packet. The method comprises the steps of associating a receive time indicator with each received data packet, computing an expiration time for each received packet based on the receive time indicator, storing the expiration time and the sequence identifier for each received packet into a table, reading the table to determine the received data packets to output in an output stream so that the received data packets are output in a selected order, determining a true expiration time for one or more unreceived data packets, and omitting a selected unreceived data packet from the output stream if the true expiration time for the selected unreceived data packet is reached.

DESCRIPTION OF THE DRAWINGS

The foregoing aspects and the attendant advantages of this invention will become more readily apparent by reference to the following detailed description when taken in conjunction with the accompanying drawings.

DETAILED DESCRIPTION

The present invention includes a system for reordering sequenced based packets in a switching network. For example, in one embodiment of the invention, a reordering system is provided that receives packets from multiple sources and reorders the received packets based on a time stamp associated with each received packet. Thus, various embodiments of the system included in the present invention are discussed in detail in the following text.

Exemplary Embodiment

Figure 1:
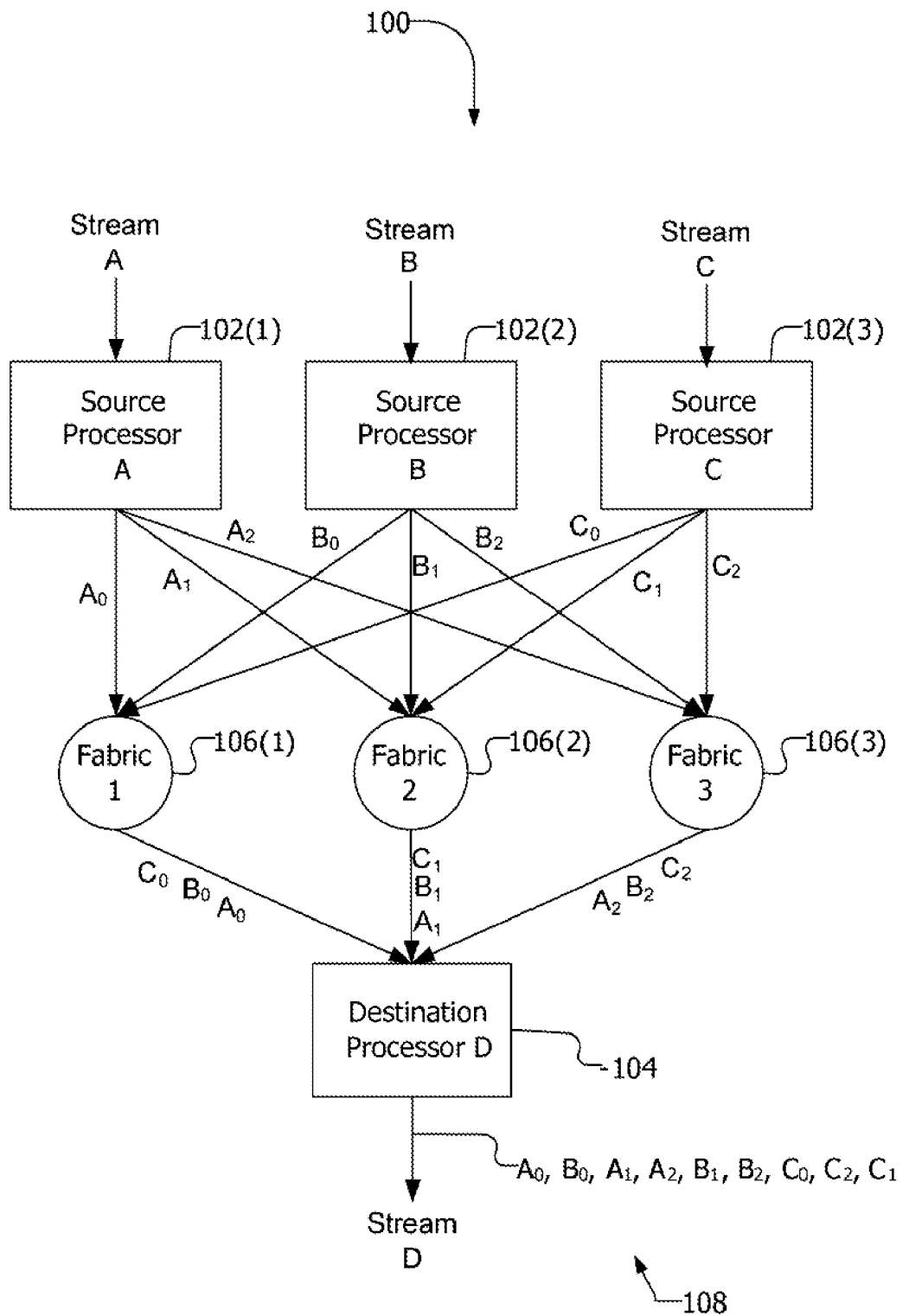
FIG. 1 shows a block diagram of a typical network structure for transmitting data packets from source processors to destination processors.
Figure 2:
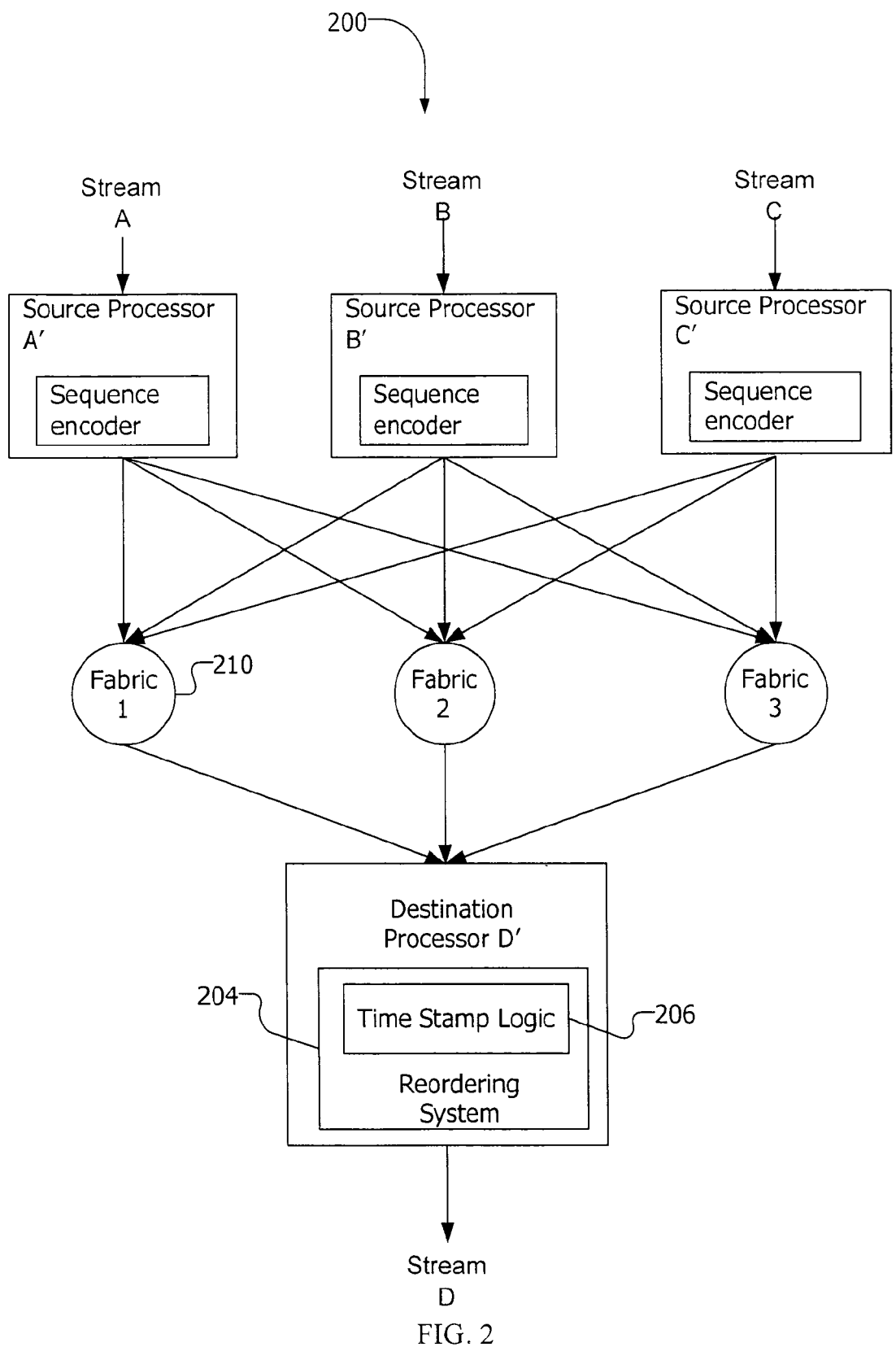
FIG. 2 shows a diagram of one embodiment of a system for reordering packets constructed in accordance with the present invention.

FIG. 2 shows a diagram of one embodiment of a system 200 for reordering frames constructed in accordance with the present invention. The system 200 includes sequence encoders 202 at each source processor that encode packets in each stream with a unique sequence identifier before transmission via fabrics 210. The system also includes a reordering system 204 constructed in accordance with the present invention that includes time stamp logic 206 that operates to associate a received time stamp with each received packet. The reordering system 204 operates to output packets at output stream D that are in the correct order with respect to how they were transmitted from their respective source processors. Furthermore, the reordering system uses the time stamp logic 206 to make a determination about lost or delayed packets so that these packets do not excessively delay or block transmission of received packets from the destination processor D'.

During operation of the system 200, the source processors receive data streams containing data packets or frames. The source processors operate to give each of the data frames a unique sequence identifier prior to transmitting them to one or more fabrics 210. For example, the sequence identifier may be a sequence number and source identifier that uniquely identifies the packet and its transmitting source. In one embodiment of the invention, the source processors also assign a priority to each frame in addition to the sequence identifier. Thus, each frame that is transmitted to the fabrics 210 includes a sequence identifier, and optionally, priority information. Any technique can be used to encode a sequence identifier and/or priority with the data frames. For example, the source processors can include encoder logic that can encode each data frame with a unique sequence number that acts as the sequence identifier. Furthermore, the encoder logic can include a priority indicator with each frame. The priority indicator can be selected from one of several priority levels. Thus, any suitable technique can be used within the scope of the invention to associate a sequence identifier and priority information with each data frame.

The system 200 also includes the reordering system 204 at the destination processor D'. The reordering system 204 operates to receive the frames from the fabrics 210 and process the frames based on their respective sequence identifiers to reorder the frames for output from the destination processor D'. The frames are reordered so that they are placed in an identical order as when they were transmitted from their respective source processors. Thus, stream D' will include all received frames in correct order The reordering system 204 also operates to assign an expiration time to unreceived frames based on receive time parameters associated with received frames. The expiration time is used to determine when unreceived frames are lost, so that the transmission of received frames as part of reordered stream D' will not pay a penalty by being excessively delayed or blocked.

Figure 3:
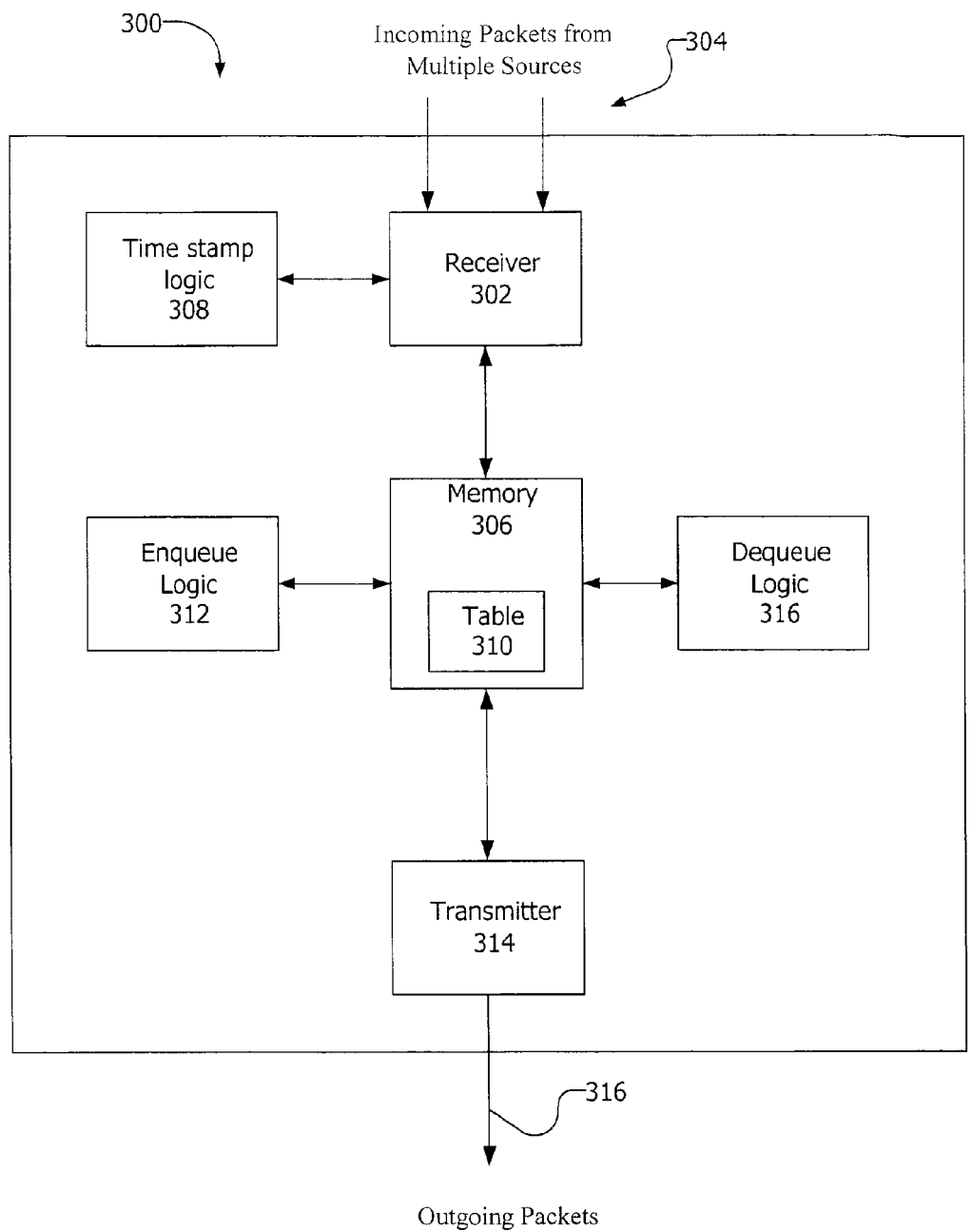
FIG. 3 shows a diagram of one embodiment of a reordering processor constructed in accordance with the present invention.

FIG. 3 shows a diagram of one embodiment of a reordering system 300 constructed in accordance with the present invention. The reordering system forms part of the destination processor D' and operates to provide reordering of received frames in accordance with the invention. In addition to reordering in accordance with the present invention, the destination processor D' may operate on the data frames in other ways to facilitate their transmission, however, these other processes are not essential to the operation of one or more embodiments of the invention, and so will not be described in detailed. For example, the destination processor D' may serialize the frames for transmission, or provide known error detection and correction processes that are independent from the reordering system.

A receiver 302 receives one or more data streams 304 that have arrived at the destination processor D'. For example, the receiver 302 receives the frames transmitted via the fabrics 210 from the source processors. The receiver 302 is coupled to a memory 306 so that each of the received frames may be stored in the memory 306.

Time stamp logic 308 is coupled to the receiver 302 and operates to provide a time stamp for each received data frame. Information about each received frame and its associated time stamp are then stored in a table 310 for later processing.

Enqueue logic 312 is coupled to the memory 306, so that the Enqueue logic 312 can control the process of loading the memory 306 with the frames as they are received and also process information in the table 310. The Enqueue logic may comprise any suitable hardware such as a CPU, gate array or other hardware logic, and may also include any suitable software to operate in conjunction with the hardware. The Enqueue logic 312 operates to load expiration times for received packets into the table 310 for later use during operation of the reordering system.

The memory 306 is coupled to a transmitter 314 that receives the frames as they are transferred out of the memory 306 in the correct order in accordance with the present invention. Thus, as the data frames are received, they are time stamped and their data is entered into memory, and as a result of the operation of one or more embodiment of the present invention, the data will flow from the memory to the transmitter 314 in the correct order for transmission to another destination. In one embodiment, the transmitter 314 transmits the frames in a single stream 316 toward their final destination. For example, the transmitter may transmit the single stream 316 into another transmission fabric. In another embodiment, the transmitter 314 operates to break-up the reordered stream 316 for transmission to another destination via several transmission fabrics.

Dequeue logic 316 is coupled to the memory 306 and operates to control the reordering of frames and the transfer of frames from the memory to the transmitter 314. For example, in one embodiment, the Dequeue logic operates to control the transfer of frames from the memory based on the sequence number and time stamp associated with each frame that is stored in the table 310. The Dequeue logic may comprise any suitable hardware such as a CPU, gate array or other hardware logic, and may also include any suitable software to operate in conjunction with the hardware.

The Dequeue logic also provides a timing function that can determine when unreceived frames have expired. For example, the Dequeue logic may wait for a selected time period before determining that an unreceived frame has been lost in transmission. In one embodiment, this time period provides a way to compensate for a latency time associated with the transmission fabrics, thus allowing frames that have been only slightly delayed during transmission through the transmission fabrics to be included in the reordered output stream. In another embodiment, the selected time period allows data frames that are either lost or excessively delayed to be declared expired, so that the Dequeue logic operates to output other frames received within acceptable time parameters. Thus, the reordering system 300 operates to perform reordering in accordance with the present invention and to prevent lost frames from excessively delaying the continued transmission of received frames.

Figure 4:
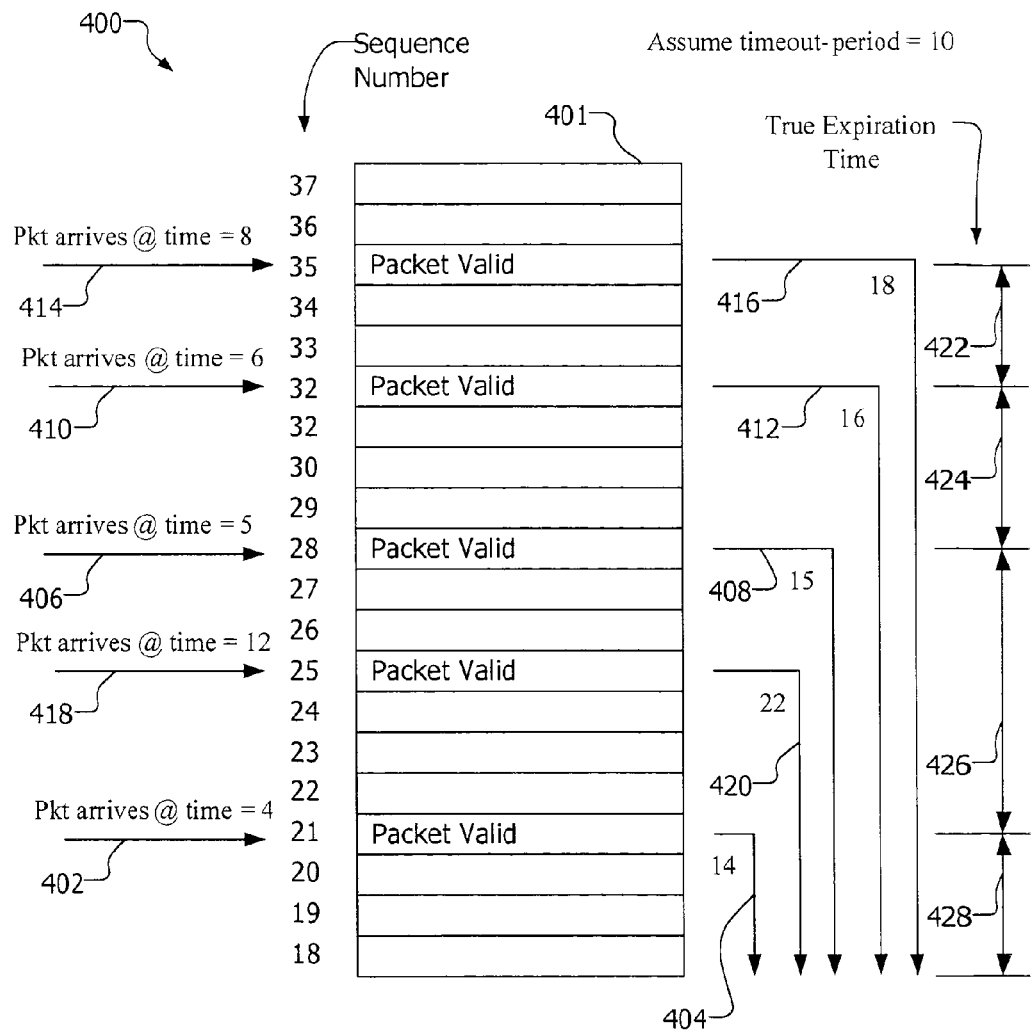
FIG. 4 shows a diagram that illustrates the computation of a true expiration time for a data packet associated with a sequence number in accordance with the present invention.

FIG. 4 shows a diagram 400 that illustrates the computation of a true expiration time for unreceived data packets in accordance with the present invention. The algorithm for determining the true expiration time is based on the following two conditions.

1. As packets are sent to the destination, they are sequenced in order.

2. If a packet with sequence number S+1 arrives at time T, then the packet with sequence number S must have either arrived or will arrive no later than time T+d, where d is the delay through the communication fabric.

As packets arrive at the destination, their data is stored away into a memory and a table 401 is used to track their reception based on their sequence number. The packets are time stamped upon reception and the arrival time of received packets is noted and a maximum timeout period is added to that arrival time to determine an expiration time for unreceived packets having earlier sequence numbers. For example, the resultant expiration time associated with a selected received packet is extended down to every packet having a earlier sequence number from that received packet. The process of extending time down to the locations that precede the current packet indicate that for every non-valid table entry (i.e., packet not received), if the time at the destination were to equal the timeout value, it could be safely assumed that the packet associated with this entry will never arrive. Since packets may arrive completely out of sequence, and since this extension is done on a per packet basis, a true expiration time for the non-valid entries is determined by taking a minimum (MIN) function of all the times that extend beyond those non-valid entries.

The following text describes the process of determining a true expiration time for non-valid entries in the table 401, (i.e., for packets that have not been received at the destination). The following computation assumes a timeout period that is equal to ten, however, any desirable timeout period may be selected. To determine expiration times associated with received packets, the time stamp associated with the received packets are used. For example, referring to FIG. 4, a valid packet is received at time (4) having sequence number twenty-one, as shown at 402. An expiration time for that packet is determined by adding the timeout period to the received time to determine an expiration time equal to fourteen. This expiration time is extended down to packets having sequence numbers less than 21 (i.e., 20, 19, 18, etc.) as shown at 404.

The next packet to arrive has sequence number (28), which arrives at time five, as shown at 406. As a result, an expiration time of fifteen (5+10) is determined and extended down to packets having sequence numbers less than 28 as shown at 408.

Another packet arrives at time (6) having sequence number thirty-two, as shown at 410. This received packet results in an expiration time of sixteen (6+10) being extended down to packets having sequence numbers less than 32, as shown at 412. Similarly, a packet received at time (8), shown at 414, and having a sequence number thirty-five establishes an expiration time of eighteen (8+10) for packets having sequence numbers less than 35, as shown at 416. Another packet arrives at time (12), as shown at 418, and has a sequence number of twenty-five. This received packet results in an expiration time of twenty-two (12+10) being assigned to packets having sequence numbers less than 25, as shown at 420.

To determine a true expiration time for non-valid table entries (i.e., unreceived packets), a MIN function is used so that for each non-valid entry, the minimum downward extended expiration time is selected as the true expiration time. For example, the minimum downward extended expiration time for sequence numbers 34-33 is 18, so the true expiration time for those unreceived packets is 18, as shown at 422. The minimum expiration time for sequence numbers 31-29 is 16, so the true expiration time for those unreceived packets is 16, as shown at 424. In a similar fashion, the minimum expiration time for the remaining unreceived packets can be used to determine their respective true expiration times. For packets 27, 26, 24, 23, and 22, the true expiration is 15, as shown at 426. For packets 20-18 the true expiration time is 14, as shown at 428. Therefore, as expiration times are set and extended downward for each received packet, and true expiration times for non-valid table entries can be determined using the MIN function.

Figure 5:
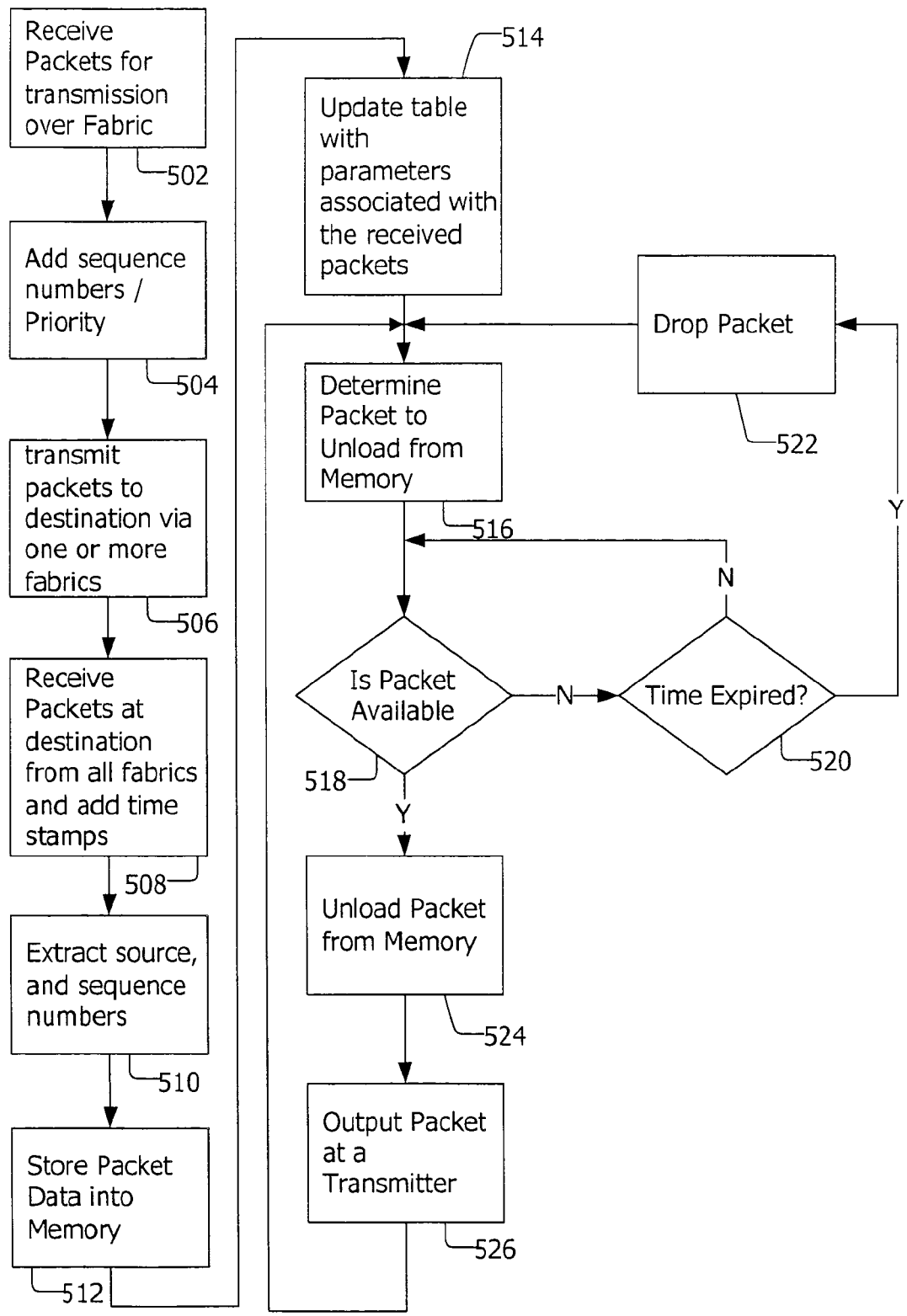
FIG. 5 shows a flow diagram of one embodiment of a method for reordering packets in accordance with the present invention.

FIG. 5 shows a flow diagram 500 for one embodiment of a method for reordering frames in accordance with the present invention. At block 502, streams of packets are received at one or more source processors for transmission over one or more fabrics to at least one destination processor. At block 504, the packets received at each source processor are given a unique sequence number, and optionally prioritized. For example, the sequence number may include a source identifier so that each packet may be uniquely identified.

At block 506, the sources transmit their respective streams of sequenced packets, via one or more fabrics, to at least one destination processor. At block 508, the streams of sequenced packets are received at the destination processor. Each received packet is provided with a time stamp that indicates a receive time for the packet.

At block 510, the sequence numbers, source identifier and any priority information is extracted from the received packets. At block 512, the packet data is stored into memory at the destination processor. A memory locator is associated with each packet, so that the packet data may be retrieved from the memory.

At block 514, a memory table is updated to map the arrival of the packets, their respective sequence numbers, expiration times, and memory pointers that identify the locations in the memory where the data associated with each packet is stored.

The operations discussed with respect to blocks 502 through 514 are repeated so that as additional packets are received from the source processors, their data is stored in memory and the memory table is updated in accordance with the above steps. The remaining steps in the method 500, shown below, are used to reorder the received packets in accordance with the present invention and transmit the received packets in the correct order to another destination.

At block 516, a determination is made to determine a packet to be unloaded from the memory for output. The packet is determined from the memory table based on sequence number, and optionally, a priority level. For example, in one embodiment, the packets are determined from their associated sequence numbers without regard to priority levels. In another embodiment, the packets with higher priority are output in sequence before packets with lower priority.

At block 518, a test is performed to determine if the determined packet is available for output. If the packet has not arrived, the method proceeds to block 520 where a test is performed to determine if the true expiration time for the packet has been reached by the current time. For example, the destination processor has a time source that is used to keep track of current time and to time stamp received packets. The true expiration time for any unreceived packet includes a selectable transmission factor that represents a transmission time through the communication fabric that the packet flows through to get to the destination. Thus, if the current time exceeds the true expiration time for the determined packet, and that packet has not been received, the packet is considered to be lost.

If the expiration time has not been reached by the current time, the method proceeds back to block 518 to continue checking to see if the packet has arrived. If the expiration time has been reached by the current time, then it is assumed that the packet has been lost, and the method proceeds to block 522 where the packet is dropped and a next packet is determined for output at block 516.

At block 524, assuming the packet is available, the selected packet is unloaded from the memory, and the freed memory is made available to store newly received data packets. For example, the memory pointer associated with the packet is reused by the Enqueue logic to store a newly received packet. At block 526, the selected packet retrieved from the memory is output from the reordering system to another destination. The method then proceeds to block 516 where another packet is determined for output in accordance with the present invention.

In accordance with the present invention, frames transmitted from a particular source are reordered to have the same order as when initially transmitted. Therefore, one or more embodiments included in the present invention provide a system for reordering frames in a switching network, so that lost frames can be determined, and as a result, the transmission of received frames is not excessively delayed.

Exemplary Operation

Figure 6:
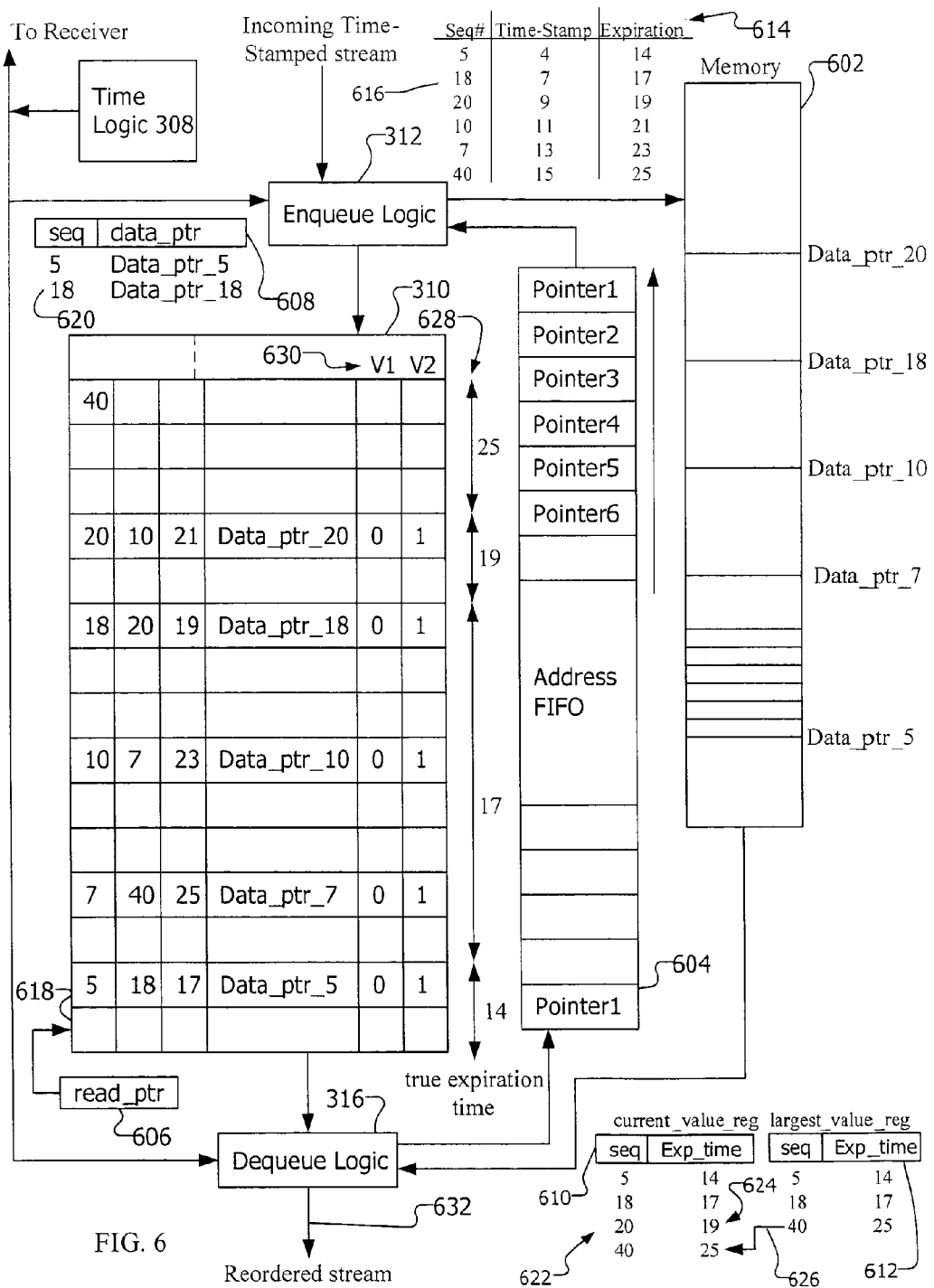
FIG. 6 illustrates an example of reordering packets in accordance with the present invention.

FIG. 6 illustrates an example of one embodiment for reordering packets in accordance with the present invention. To demonstrate the operation of this embodiment of the invention, it will be assumed that a stream of packets transmitted from a particular source processor is received at a destination processor and reordered in accordance with the present invention. Although one or more embodiments included in the present invention operate to reorder packets received from multiple source processors that may have multiple priority levels, for the purposes of clarity, the present example demonstrates reordering of packets received from a single source processor. However, it will be apparent to one with skill in the art that the embodiments of the invention described herein can be expanded, modified, or adjusted to reorder packets received from multiple source processors.

In one embodiment, the reordering system may be implemented in a single integrated circuit (IC chip), where tables and/or memory that are used to reorder the packets are implemented in an off-chip memory (SDRAM or SRAM). However, it is also possible to implement the tables and/or memory on-chip.

Referring now to FIG. 6 there is shown Enqueue logic 312, Dequeue logic 316, time logic 308, and memory 602 with associated address FIFO 604. Also shown in FIG. 6 is memory table 310. In the present embodiment, the memory 602, FIFO 604 and table 310 are part of the memory 306 of FIG. 3. However, in accordance with the invention, these elements may be formed from the same memory or separate memories, or may be formed from any other combination of logic, memory or registers.

There are four registers that are also part of the reordering system shown in FIG. 6. The four registers are associated with each transmitting source processor for reordering packets associated with each respective source processor. For clarity, the registers are shown as individual registers, however, the registers may be part of the Enqueue logic 312, the Dequeue logic 316 or implemented in any other hardware or software associated with the reordering system. The four registers are defined as follows.

1. A read pointer (read_ptr) register 606 points at a current location in the table 310 and is used when forming the reordered output stream.

2. A delayed store (delayed_store) register 608 stores parameters associated with incoming packets until the parameters are ready to be written into the table 310.

3. A current value (current_value) register 610 holds an ongoing current sequence number and expiration time used when forming the reordered output stream.

4. A largest value (largest_value) register 612 holds the largest sequence number and expiration time seen while reading parameters from the table 310 when forming the reordered output stream.

As packets arrive at the destination processor, the Enqueue logic 312 obtains a memory pointer from the address FIFO 604 and uses this pointer to store the packet's data into the memory 602. As packets enter the reorder system, a timestamp will be associated with each packet as will a timeout-period (this timeout-period is under software control and can be modified for any reason). For example, the time out period represents the time it is expected to take for a packet to flow from the source to the destination via the communication fabric.

An expiration time is calculated by adding the time-stamp and timeout-period together. The sequence number of the packet and expiration time are packet parameters that are referred to as the data-pair of the packet. The data-pair of the packet are stored in the table 310 at a table location indicated by a current sequence number that is contained in the delayed_store register 608. The table location pointed to by the delayed_store register represents a pointer from the previous packet.

To illustrate the above process, it will be assumed that a stream of packets is received at the reordering system, and sequence numbers, time stamps and expiration times for a portion of those packets are shown at 614. It will be assumed that the packet with sequence number (5) has been processed by the Enqueue logic of the reordering system. When this packet is processed, its sequence number and memory pointer are stored into the delay_store register 608. The next packet to be processed has sequence number (18) as shown at 616.

The Enqueue logic obtains a memory pointer from the address FIFO 604 and uses this pointer to store the data associated with packet (18) into the memory 602. The Enqueue logic then stores the data-pair (seq/exp) for packet 18 in the table 310 at the address pointed to by the delay_store register. Thus, the data-pair for packet 18 is stored at location (5) in the table 310 as shown at 618. Also stored at location (5) in the table 310 is the memory pointer for packet (5) data. The Enqueue logic then stores the sequence number and memory pointer for packet (18) into the delay_store register 608 as shown at 620. Thus, the next packet processed by the Enqueue logic will have its parameters stored at location (18) in the table 310.

To summarize the above process, the data pointer for the packet having sequence number (5) that is stored in the table 310 is correct for that sequence number, but the accompanying data-pair points to the next packet that has arrived. At the same time, the new packet (18) has its sequence number and memory pointer stored into the delayed_store register 608. Thus, the delayed_store register lives-up to its name by delaying stores into the table 310 until a subsequent packet is received. The delayed store register also skews where the stores happen (i.e. addressing) so as to adhere to the underlying algorithm included in the present invention.

The above process is used by the reordering system included in the present invention to receive packets, time stamp the packets, compute an expiration time for the packets, store the packet data into memory, and store packet parameters into the table 310. The following text will describe how the reordering system operates to retrieve the packet data from memory and reorder the packets to form a reordered output stream in accordance with the present invention.

The Dequeue logic operates to retrieve the packet data from the memory 602 using the read-ptr register 606 and the table 310 to form a reordered output stream 632. The read_ptr register points to the next sequence number in the table 310 to determine the packet data to be retrieved from the memory. If the value read from the table at the selected sequence number is valid, its accompanying memory data pointer is used to retrieve the data from memory for output. If the value from the table is not valid, the Dequeue logic operates to determine if the packet associated with that sequence number has expired.

To determine whether the packet associated a sequence number has expired, the Dequeue logic compares the current time (system time) from the time logic 308 to the expiration time stored in the current_value register 610. If the expiration time stored in the current_value register is greater than the system time, the Dequeue logic operates to determine if the packet has been received and is being processed by the Enqueue logic. Thus, the packet has not expired and the system operates to wait to receive that packet. However, once the system timer equals the expiration time and the packet has still not arrived, the Dequeue logic deems that packet to be lost, and the read_ptr is incremented to point to the next entry in the table to find the next sequenced packet to output. If the next entry is not valid, a comparison of expiration time (which hasn't changed because no valid packet has been read) and the system time will indicate that that entry is lost as well. This process continues until a valid entry is read.

The current_value register holds the next data-pair (i.e., the next sequence number and expiration time) that can be used to define the true expiration time for one or more packets. For example, entries for the current_value register for the above example are shown at 622. The current_value register is updated when the read_ptr equals the current_value sequence number. For example, when the read_ptr points to sequence number (18) in the table 310, the current value register is updated to have a sequence number of (20) and an expiration time of (19), as shown at 624.

If the next sequence value read from the table is less than the current_value's sequence number, the largest_value register 612 is used to determine the entries in the current_value register 610. This prevents a situation where a previously accessed sequence number's expiration time is used. For example, when the read_ptr is at sequence number (20) the sequence number read from the table is (10). This number is less than the value in the current_value register. In this case, the next entries for the current_value register are determined from the largest_value register 612. Thus, the sequence number (40) and expiration time (25) are entered into the current_value register, as show at 626.

The largest_value register holds the largest sequence number read thus far from the table. As each entry in the table is read, this register is updated with every sequence number that is higher than the current contents of the register. The associated expiration time is also entered. Therefore, the use of the current_value register and the largest_value register operate to provide true expiration times for the packets, as shown at 628. Upon reset, the current value register will equal the first read_out value pair.

There are two valid bits (v1 and v2), shown at 630, that are part of the table 310 and are used to reduce the number of writes that are necessary to invalidate entries as they are read. A selected column, for instance v1, is used to indicate whether or not the current table entry is valid, and the other column, v2 in this case, is reset when v1 is written. For example, referring to table 310, v2 is used to indicate that current table entries are valid when a "1" is present. At the same time, v1 is set to "0." When enough frames are received so that the table fills and eventually wraps-around, v1 will then be set to "1" when a new entry is valid, and v2 will be reset to "0." Thus, by alternating between v1 and v2 to indicate when a table entry is valid (i.e., a packet has arrived), it is only necessary to perform one write operation to validate an entry, which eliminates the need to perform a second write operation to invalidate the entry when the corresponding packet is output.

There is a global setting that indicates which valid bit (v1 or v2) to use to indicate that a table entry is valid. For example, the global setting is controlled by the Enqueue logic 312. In this way, when all the table entries are exhausted, the system changes the global setting to reverse the role of the valid bits (v1, v2) so that the Dequeue logic knows to look at the correct valid bit to determine when a table entry is valid. Therefore, an extra write cycle is not needed to invalid an entry.

As the Dequeue logic 316 reads the table 310 to obtain address pointers for the packet data to be output, those address pointers are returned to the FIFO 604 so that they may be reused by the Enqueue logic 312 to store newly received packet data. By using the read_ptr register to sequentially read the table 310 to obtain address pointers to received packet data, the Dequeue logic operates to output the packet data in the correct order with respect to how it was transmitted from the originating source processor. The Dequeue logic also operates to determine true expiration times for unreceived packets and skips those packets when it is determined that they have expired, thereby preventing lost packets from unreasonably delaying or blocking the formation of the output stream 632.

Pseudo Code

To further illustrate the inter-workings of the reordering algorithm included in the present invention, the following pseudo-code is presented that describes how the current_value and largest_value registers are updated in accordance with the present invention.

Current_Value Register

To initialize this register, after a reset occurs the sequence number included with the first incoming packet is entered as the current_value. The following code is used to update the current_value register after initialization.

```
if (read_ptr==current_value.sequence_number)
  current_value.sequence_number=read_out.sequence_number
  current_value.expiration_time=read_out.expiration_time
if (read_ptr=current_value.sequence_number)
  if (current_value.sequence_number>read_out.sequence_number)
    current_value.sequence_number=largest_value.sequence_number
    current_value.expiration_time=largest_value.expiration_time
  if ((read_ptr==current_value.sequence_number) & !valid)
    send delay_store register
Largest_Value Register
```

The largest_value register operates as a place holder for the highest sequence numbers read from the table during operation of the reordering system. The following code is used to update the largest_value register after initialization.

```
if (read_out.sequence_number>largest_value.sequence_number)
  largest_value.sequence_number=read_out.sequence_number
  largest_value.expiration_time=read_out.expiration_time
```

Although described with reference to the utilization of the table 310, it will be apparent to one with skill in the art that a separate table, memory, or memory map may be used to process data packets from each transmitting source processor, and if required, for each respective priority used. Thus, in other embodiments of the present invention, the Enqueue logic and the Dequeue logic are coupled to multiple tables, and processing steps similar to those described above are performed for each table to reorder the received data packets for output in the reordered stream 632.

The present invention includes a system for reordering sequenced based packets in a switching network. The embodiments described above are illustrative of the present invention and are not intended to limit the scope of the invention to the particular embodiments described. Accordingly, while several embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

It is claimed:

1. A method for receiving, reordering, and transmitting data packets, wherein each data packet contains a sequence identifier, the method comprising:
   receiving data packets
   for each received data packet:
     extracting a sequence number from the data packet
     associating a receive time indicator with the data packet
     calculating an expiration time for the received data packet based on the associated receive time indicator
     recording the sequence number and the calculated expiration time in a table in sequence number order
   for each data packet to be transmitted:
     reading the table to determine a next data packet to be transmitted
     transmitting the next data packet if the next data packet is available
     if the next data packet is unavailable
       determining a true expiration time for the unavailable next data packet
       waiting for the unavailable next data packet to become available if a current time is less than the true expiration time for the unavailable next data packet
       defining the unavailable data packet as lost if the current time is greater than the true expiration time for the unavailable data packet.

2. The method of claim 1, further comprising:
   obtaining a memory pointer from an address FIFO for each received data packet
   storing each received data packet in a memory based on the associated memory pointer
   recording the memory pointer in the table entry for the received data packet.

3. The method of claim 2, further comprising returning the memory pointer associated with each data packet in the output stream to the address FIFO.

4. The method of claim 1, wherein the next data packet to be transmitted is determined based on the sequence numbers stored in the table.

5. The method of claim 1, wherein the next data packet to be transmitted is determined based on the sequence numbers stored in the table and a priority level associated with at least some of the received data packets.

6. The method of claim 1, wherein the calculated expiration time of a received data packet is determined by adding a predetermined time-out period to the receive time indicator.

7. The method of claim 1, wherein the true expiration time of an unavailable data packet is determined to be the lowest expiration time of all received data packets having a higher sequence number than the sequence number of the unavailable data packet.

8. A system for reordering data packets at a destination processor in a packet switching network, wherein a sequence identifier is associated with each data packet, the system comprising:

time stamp logic that operates to associate a receive time indicator with each received data packet enqueue logic that operates to extract a sequence number from each received data packet compute an expiration time for each received data packet based on the receive time indicator store the extracted sequence number and computed expiration time into a table based on the sequence identifiers associated with the received data packets dequeue logic that operates to read the table to determine a next data packet to be transmitted output the next data packet if the next data packet is available if the next data packet is unavailable determine a true expiration time for the unavailable next data packet wait for the unavailable next data packet to become available if a current time is less than the true expiration time for the unavailable data packet define the unavailable data packet as lost if the current time is greater than the true expiration time for the unavailable data packet.

9. The system of claim 8, further comprising:

a memory coupled to the enqueue logic a pointer FIFO coupled to the enqueue logic wherein the enqueue logic operates to obtain a pointer to the memory from the pointer FIFO for each received data packet and stores the received data packets in the memory based on the pointers.

10. The system of claim 9, wherein the memory and the pointer FIFO are coupled to the dequeue logic.

11. The system of claim 10, further comprising a read pointer register that is used to read selected entries from the table.

12. The system of claim 11, further comprising a delay store register that is used to store the pointers into the table.

13. The system of claim 12, further comprising a current value register that is used to determine the true expiration time.

14. The system of claim 13, further comprising a largest value register that is used to maintain a largest sequence identifier value.

15. The system of claim 8, wherein the dequeue logic determines the next data packet to be transmitted based on the sequence numbers stored in the table.

16. The system of claim 8, wherein the dequeue logic determines the next data packet to be transmitted based on the sequence numbers stored in the table and a priority level associated with at least some of the received data packets.

17. The system of claim 8, wherein the enqueue logic determines the computed expiration time of a received data packet by adding a predetermined time-out period to the receive time indicator.

18. The system of claim 8, wherein the dequeue logic determines the true expiration time of an unavailable data packet to be the lowest expiration time of all received data packets having a higher sequence number than the sequence number of the unavailable data packet.

\* \* \* \* \*